United States Patent

[11] 3,607,146

| [72] | Inventor | Roger K. Ballard |
| | | Salt Lake City, Utah |
| [21] | Appl. No. | 4,022 |
| [22] | Filed | Jan. 19, 1970 |
| [45] | Patented | Sept. 21, 1971 |
| [73] | Assignee | The United States of America as represented by the United States Atomic Energy Commission |

[54] PREPARATION OF CHEMICALLY REACTIVE URANIUM TRIOXIDE
6 Claims, No Drawings

[52] U.S. Cl. .................................................. 23/347,
  23/326, 23/354, 252/301.1, 23/346
[51] Int. Cl. ........................................... C01g 43/00,
  C01g 43/02
[50] Field of Search ........................................ 23/326,
  346, 354, 347, 355; 252/301.1

[56] References Cited
UNITED STATES PATENTS

| 2,723,181 | 11/1955 | Larson ........................ | 23/354 |
| 2,735,745 | 2/1956 | Flook et al. .................. | 23/354 |
| 3,212,846 | 10/1965 | Burko et al. ................. | 23/354 |
| 3,288,571 | 11/1966 | Werner et al. ................ | 23/347 |
| 3,318,670 | 5/1967 | Grimmett ..................... | 23/344 |

Primary Examiner—Carl. D. Quarforth
Assistant Examiner—F. M. Gittes
Attorney—Roland A. Anderson ABSTRACT: The chemical reactivity of uranium trioxide produced by the fluidized bed process is increased by adding a small amount of aluminum nitrate and a slight excess of nitric acid to the aqueous uranyl solution prior to denitration in a fluidized bed at a temperature of at least 400° C.

PREPARATION OF CHEMICALLY REACTIVE URANIUM TRIOXIDE

CONTRACTUAL ORIGIN OF THE INVENTION

The invention described herein was made in the course of, or under, a contract with the United States Atomic Energy Commission.

BACKGROUND OF THE INVENTION

This invention relates to a method of producing a chemically reactive form of uranium trioxide. More specifically, this invention relates to an improvement in the fluidized bed method of making uranium aluminide by increasing the quantity and quality of the product obtained therefrom.

The fluidized bed method for making uranium aluminide is described in detail in U.S. Pat. No. 3,318,670, issued to E. S. Grimmett May 9, 1967. By this method, substantially spherical particles of aluminum are charged into a reactor and fluidized with air. After heating the reactor to 350° C. an aqueous solution of uranyl nitrate is sprayed onto the bed. The uranyl nitrate decomposes to uranium trioxide which is deposited as a coating on the aluminum spheres. The deposition of the coating continues until a proper weight ratio of uranium to aluminum is obtained. The uranium trioxide so formed is then reduced by introducing ethanol or methanol vapor into the reactor with argon as a fluidizing gas at 350° C. The uranium dioxide so formed is then chlorinated by introducing carbon tetrachloride vapor with the argon fluidizing gas at the same temperature. Following chlorination, fluidization with argon is continued and the reactor is heated to 600° C. which causes the uranium tetrachloride coating to react with the aluminum core to produce substantially pure uranium aluminide particles and gaseous aluminum trichloride which is exhausted with the off-gases. The uranium aluminide formed may be the di-, tri-, or tetra-aluminide, depending upon the weight ratio of aluminum to uranium in the aluminum-uranium trioxide process.

The uranium aluminide produced by this method is of good quality. However, the yields obtained are less than ideal and the product contains aluminum oxide and uranium dioxide as well as other contaminants which must be removed before the uranium aluminide can be further processed into nuclear reactor fuel elements. The poor product yields and product contamination are due to the lack of reactiveness of the uranium trioxide produced by the fluidized bed denitration of uranyl nitrate. This unreactive form of uranium trioxide is difficult to reduce completely to uranium dioxide and the uranium dioxide so formed is difficult to chlorinate to uranium tetrachloride. This results in unreacted products which then combine to form contaminants in the final product such as carbon, aluminum oxide and uranium dioxide.

SUMMARY OF THE INVENTION

I have invented an improvement in the fluidized bed process for making uranium aluminide which eliminates many of the above-cited problems and which results in a high yield of uranium aluminide containing very little contamination. By the use of my improvement, the fluidized bed process for the denitration will also produce uranium trioxide having increased chemical reactivity which may then be further processed by other methods. By my invention I have found that, if a small amount of aluminum nitrate and a small excess of nitric acid are added to the aqueous uranyl nitrate solution before it is sprayed onto the fluidized bed for denitration, an active amorphous form of uranium trioxide is formed around the aluminum particles rather than the yellow crystalline "inactive" form of uranium trioxide which normally results from fluidized bed denitration of uranyl nitrate.

It is therefore one object of this invention to provide a method of producing a chemically reactive form of uranium trioxide.

It is another object of this invention to provide a method of producing a reactive form of uranium trioxide in a fluidized bed.

It is still another object of this invention to provide an improvement in the fluidized bed method of making uranium aluminide.

It is a further object of this invention to provide a method of producing a coating of chemically reactive uranium trioxide about aluminum particles in a fluidized bed.

Finally it is an object of this invention to provide an improvement in the fluidized bed method of making uranium aluminide whereby the uranium trioxide produced as an intermediary product in the process is more chemically reactive so that further processing will produce a greater yield of uranium aluminide having less contamination than was heretofore possible.

DESCRIPTION OF THE PREFERRED EMBODIMENT

These and other objects may be achieved by adding to an aqueous uranyl nitrate solution sufficient aluminum nitrate to make the weight ratio of aluminum to uranium in the solution about 0.01, adding sufficient excess nitric acid to the solution to make the mole ratio of nitric acid to uranium at least 0.35 and spraying the resulting uranyl nitrate solution into a fluidized bed which is at a temperature of at least 400° C. The uranyl nitrate decomposes to an amorphous form of uranium trioxide which is more chemically reactive than uranium trioxide produced in a fluidized bed from uranyl nitrate solution without the aforementioned additives.

It is obvious that by varying the fluidized bed material and the fluidizing conditions several different results may be achieved. Thus, by fluidizing aluminum particles properly, the amorphous uranium trioxide may be made to coat the aluminum particles which may then be further processed to form uranium aluminide. By using different bed material under different fluidizing conditions, amorphous uranium trioxide fines may also be produced by this process. Any aluminum oxide remaining in the fines as a contaminant will be chlorinated during subsequent processing to form the volatile aluminum trichloride which will leave the reaction zone as a gas.

The concentration of the uranyl nitrate in solution is important and should be at least 1.3 M. Concentrations of less than this will result in a uranium trioxide which is more dense than desired and consequently less reactive than the product sought to be achieved. Concentrations greater than 2.0 M are not soluble in an aqueous solution.

The amount of aluminum nitrate added to the uranyl nitrate solution is critical in order to achieve the desired uranium trioxide chemical reactivity. In general, a weight ratio of aluminum to uranium of from 0.01 to 0.02 will produce excellent results, although the lower ratio is preferred. Lower concentrations will result in decreased chemical activity of the resultant uranium trioxide, while a ratio of greater than 0.02 will result in aluminum oxide contaminant in the final product.

The solution must also contain a mole ratio of excess nitric acid to uranium of at least 0.35 to achieve satisfactory results. No positive upper limit has been established, although a mole ratio of 0.77 has been found to give a satisfactory product.

It has also been discovered that the temperature at which denitration occurs has an effect upon the reactivity of the resulting uranium trioxide product. Thus, a minimum temperature of 400° C. was found to be necessary to produce a satisfactory chemically reactive product. Although the temperatures have not been optimized, a temperature of up to 500° C. should prove satisfactory. Temperatures lower than 400° C. were found to result in residual nitrates and carbon which show up in the final product as contaminants.

Reduction of the uranium trioxide to uranium dioxide and chlorination of the uranium dioxide so formed may be accomplished as described in the before-mentioned patent and form no part of the process of the present invention.

In the following table are the parameters and results of a series of runs which demonstrate the effectiveness of the process. The results are determined by the percent of conversion of uranium dioxide to uranium tetrachloride, since this is directly dependent upon the chemical reactivity of the product, all other parameters being the same.

| Run No. | Chlorination time, hr. | Reduction time, hr. | Conversion of UO₂ to UCl₄, percent | Uranyl nitrate concentration, molar | Denitration, temp., °C. |
|---|---|---|---|---|---|
| 1 | 2.1 | 2.0 | 58 | 1.3 | 400 |
| 2 | 2.0 | 2.0 | 18 | 1.3 | 400 |
| 3 | 2.0 | 2.0 | 40 | 1.3 | 400 |
| 4 | 1.5 | 2.0 | 70 | 1.3 | 400 |
| 5 | 2.0 | 2.0 | 59 | 1.3 | 400 |
| 6 | 1.5 | 2.0 | 21 | 1.3 | 350 |
| 7 | 2.0 | 2.0 | 54 | 1.3 | 440 |
| 8 | 1.5 | 2.0 | 65 | 1.7 | 400 |
| 9 | 2.0 | 2.0 | 58 | 1.3 | 400 |
| 10 | 1.5 | 2.0 | 18 | 0.8 | 400 |
| 11 | 3.0 | 2.0 | 96.5 | 2.0 | 430 |
| 12 | 4.0 | 2.0 | 92.5 | 1.3 | 405 |

| Run No. | Excess acid HNO₃/U, mole ratio | AlNO₃ concentration, Al/U, wt. ratio | Reduction fluidizing gas concentration of MeOH in argon, cc./min., MeOH/s.c.f.h. argon | Chlorination fluidizing gas concentration of CCl₄ in argon, cc./min., CCl₄/s.c.f.h. argon |
|---|---|---|---|---|
| 1 | 0.77 | .01 | .1 | .1 |
| 2 | 0.77 | 0.00 | .1 | .1 |
| 3 | 0.225 | 0.01 | .1 | .1 |
| 4 | 0.384 | 0.01 | .1 | .1 |
| 5 | 0.77 | 0.01 | .1 | .1 |
| 6 | 0.77 | 0.01 | .1 | .1 |
| 7 | 0.77 | 0.01 | .1 | .1 |
| 8 | 0.77 | 0.01 | .1 | .1 |
| 9 | 0.77 | 0.01 | .1 | .1 |
| 10 | 0.77 | 0.01 | .1 | .1 |
| 11 | 0.77 | 0.01 | .1 | .1 |
| 12 | 0.77 | 0.01 | .1 | .1 |

NOTE.—The reduction temperature for all runs was 360° C. The chlorination temperature for the first 10 runs was 390° C. and for the last 2 runs 350 °C.

It is readily apparent from the above table that the percentage of conversion of uranium dioxide to uranium tetrachloride in runs 2, 3, 6 and 10 was greatly affected by variations in the operating parameters.

It should be noted that the results achieved in the conversion of uranium dioxide to uranium tetrachloride were substantially improved in runs 11 and 12 over the results achieved in the prior runs, due to a lowering of the chlorination temperature in these last two runs to 350° C. from the 390° C. temperature previously used.

It is to be understood that the invention is not to be limited to the details given herein but that it may be modified within the scope of the appended claims.

The embodiments of the invention in which an exclusive property or privilege is claimed are defined as follows:

1. In a process for making uranium aluminide by fluidizing a bed of aluminum particles with air, spraying and aqueous solution of uranyl nitrate into the bed at 350° C. until the desired weight ratio of uranium to aluminum is attained. The uranyl nitrate thereby decomposing to uranium trioxide which deposits on the aluminum particles, discontinuing the uranyl nitrate feed, fluidizing the bed with a mixture of methanol and argon at 350° C., whereby the uranium trioxide in the coating is reduced to uranium dioxide, fluidizing the bed with a mixture of carbon tetrachloride and argon at 350° C., whereby the uranium dioxide in the coating is converted to uranium tetrachloride, and fluidizing with argon alone at a temperature of 600° C., whereby the uranium tetrachloride reacts with the aluminum to form uranium aluminide while aluminum trichloride is volatilized, the improvement comprising adding to said aqueous solution of uranyl nitrate, aluminum nitrate to a weight ratio of aluminum to uranium of 0.01 to 0.02, adding nitric acid to said solution to a mole ratio of nitric acid to uranium of at least 0.3 and spraying the resulting solution into the fluidized bed at a temperature of at least 400° C., whereby the resulting uranium trioxide has increased reactivity to the succeeding process steps.

2. The method of claim 1 wherein the aqueous uranyl nitrate solution contains 1.3 to 2.0 molar uranyl nitrate.

3. The process of claim 2 wherein the weight ratio of aluminum to uranium is 0.01 in the uranyl nitrate solution.

4. The process of claim 3 wherein the mole ratio of nitric acid to uranium in the uranyl nitrate solution is from 0.35 to 0.77.

5. In the method of producing uranium trioxide by spraying an aqueous solution of uranyl nitrate into a heated fluidized bed of aluminum particles, the improvement comprising adding aluminum nitrate to an aqueous solution of 1.3 to 2.0 molar uranyl nitrate to a weight ratio of aluminum to uranium of 0.01 to 0.02, adding nitric acid to said solution to a mole ratio of nitric acid to uranium of 0.35 to 0.77 and heating said fluidized bed to a temperature of at least 400° C., whereby the uranium trioxide produced thereby has increased chemical reactivity.

6. The method of claim 5 wherein the weight ratio of aluminum to uranium is 0.01 in the uranyl nitrate solution.